United States Patent
Lee et al.

(10) Patent No.: US 9,312,656 B2
(45) Date of Patent: Apr. 12, 2016

(54) PULSE LASER GENERATOR AND OPTICAL FIBER SENSOR SYSTEM USING SAME

(71) Applicant: KOREA INSTITUTE OF INDUSTRIAL TECHNOLOGY, Cheonan-si (KR)

(72) Inventors: Ho Jae Lee, Cheonan-si (KR); Ki Nam Joo, Gwangju (KR)

(73) Assignee: KOREA INSTITUTE OF INDUSTRIAL TECHNOLOGY, Cheonan-Si (KR)

( * ) Notice: Subject to any disclaimer, the term of this patent is extended or adjusted under 35 U.S.C. 154(b) by 0 days.

(21) Appl. No.: 14/404,116

(22) PCT Filed: May 31, 2013

(86) PCT No.: PCT/KR2013/004815
§ 371 (c)(1),
(2) Date: Nov. 26, 2014

(87) PCT Pub. No.: WO2013/180516
PCT Pub. Date: Dec. 5, 2013

(65) Prior Publication Data
US 2015/0138531 A1    May 21, 2015

(30) Foreign Application Priority Data
Jun. 1, 2012  (KR) .......................... 10-2012-0058989
May 30, 2013  (KR) .......................... 10-2013-0062040

(51) Int. Cl.
*G02B 21/36* (2006.01)
*H01S 3/11* (2006.01)
(Continued)

(52) U.S. Cl.
CPC ................. *H01S 3/11* (2013.01); *G01B 11/165* (2013.01); *G01D 5/35309* (2013.01);
(Continued)

(58) Field of Classification Search
CPC .................. G01N 2201/08; G01N 2021/6484; G02B 21/361
See application file for complete search history.

(56) References Cited

U.S. PATENT DOCUMENTS 6,251,688 B1 *  6/2001  Erb et al. ....................... 436/518
7,420,662 B2 *  9/2008  Yalin et al. ....................... 356/72
(Continued)

FOREIGN PATENT DOCUMENTS

JP       2006324613       11/2006
JP       2007510143        4/2007
(Continued)

*Primary Examiner* — Thomas A Hollweg
*Assistant Examiner* — Mary A El Shammaa
(74) *Attorney, Agent, or Firm* — Lex IP Meister, PLLC

(57) ABSTRACT

Disclosed are a pulse laser generator and an optical fiber sensor system using the same. The optical fiber sensor system includes a main optical coupler that receives pulse laser light generated from a pulse laser generator from a first input terminal, branches the light to first and second output terminals to output, and outputs, through a third output terminal, light input reversely from the first and second output terminals, a reference optical fiber that is connected to the first output terminal, a multi-point sensing optical fiber unit that is connected to the second output terminal, and in which optical fibers are connected in series or in parallel corresponding to a plurality of sensing points, an optical detection unit that is connected to the third output terminal, and a diagnosis processing unit that detects a change of the physical quantity for the sensing points from signals from the optical detection unit.

6 Claims, 6 Drawing Sheets

(51) Int. Cl.
  *G01K 11/32* (2006.01)
  *G01D 5/353* (2006.01)
  *G01B 11/16* (2006.01)
  *G01L 11/02* (2006.01)
  *G01L 1/24* (2006.01)
  *H01S 3/067* (2006.01)
  *H01S 3/1055* (2006.01)
  *H01S 3/106* (2006.01)
  *H01S 3/16* (2006.01)

(52) U.S. Cl.
  CPC ............ *G01K 11/32* (2013.01); *G01K 11/3206* (2013.01); *G01L 1/242* (2013.01); *G01L 11/025* (2013.01); *H01S 3/06791* (2013.01); *H01S 3/106* (2013.01); *H01S 3/1055* (2013.01); *H01S 3/1112* (2013.01); *H01S 3/1618* (2013.01)

(56) References Cited

U.S. PATENT DOCUMENTS

2005/0259254 A1* 11/2005 Soller et al. .................... 356/328
2012/0281229 A1* 11/2012 Montgomery et al. ........ 356/477

FOREIGN PATENT DOCUMENTS

| | | |
|---|---|---|
| JP | 2010054366 | 3/2010 |
| KR | 10-2012-0052920 | 5/2012 |

* cited by examiner

PULSE LASER GENERATOR AND OPTICAL FIBER SENSOR SYSTEM USING SAME

TECHNICAL FIELD

The present invention relates to a pulse laser generator and an optical fiber sensor system using the same, and more particularly, to an optical fiber sensor system employing a pulse laser generator which may measure a physical quantity for a plurality of sensing points.

BACKGROUND ART

In recent years, a variety of sensor systems have been developed for safety diagnoses of large structures or buildings such as bridges, dams, ships, and the like.

A method of measuring deformation of the structure using an optical fiber grating among these sensor systems has been known in various ways such as disclosed in Korean Patent No. 10-2005-0099087.

However, such a method using the optical fiber grating should detect a wavelength shift of light emitted from a light source, and therefore analysis of response light is complex.

DISCLOSURE

Technical Problem

The present invention is directed to an optical fiber sensor system employing a pulse laser generator which may facilitate analysis of light input to an optical detection unit while facilitating measurement of a physical quantity for a plurality of points.

Technical Solution

According to an aspect of the present invention, there is provided an optical fiber sensor system using a pulse laser, including: a pulse laser generator that generates and outputs pulse laser light; a main optical coupler that receives the pulse laser light generated and outputted from the pulse laser generator from a first input terminal, branches the received light to a first output terminal and a second output terminal to output the branched light, and outputs, through a third output terminal, light input reversely from each of the first output terminal and the second output terminal; a reference optical fiber that is connected to the first output terminal and reflects light input through the main optical coupler to provide a reference optical signal, and extends by a predetermined length as an optical fiber; a multi-point sensing optical fiber unit that is connected to the second output terminal, and in which optical fibers are connected in series or in parallel corresponding to a plurality of sensing points so as to measure a physical quantity to be measured for each of the plurality of sensing points; an optical detection unit that converts an optical signal input through the third output terminal into an electrical signal; and a diagnosis processing unit that detects a change of the physical quantity which is set for the sensing points from a signal output from the optical detection unit.

Here, the pulse laser generator may include a pumping light source that emits light, an amplification optical fiber doped with ytterbium or erbium that amplifies light made incident from the pumping light source, an optical fiber resonator that forms a ring type resonator using the optical fiber so that light supplied from the pumping light source resonates while being circulated through the amplification optical fiber, an optical input unit that causes light emitted from the pumping light source to be incident to the optical fiber resonator, an output optical coupler that is coupled to the optical fiber resonator to output pulse light generated from the optical fiber resonator through a main output terminal, a phase synchronization unit that is coupled to the optical fiber resonator to synchronize a phase, and a dispersion compensation scanning unit that is coupled to both ends of the optical fiber resonator to compensate for dispersion of input light so that a pulse width is adjusted narrow, and is controlled by the diagnosis processing unit so that a resonance length of the optical fiber resonator is variable.

Also, the dispersion compensation scanning unit may include a first mirror that is disposed to reflect light made incident through one end of the optical fiber resonator in a direction different from an incident path, a second mirror that is disposed to face the first mirror and is disposed to reflect light made incident from the first mirror in a direction different from that of the first mirror, a third mirror that is disposed to reflect light made incident from the second mirror in a direction different from that of the second mirror, and a fourth mirror that is disposed to reflect light made incident from the third mirror so that the reflected light is made incident to the other end of the optical fiber resonator, a grating having an uneven pattern that may be formed on surfaces of the first to fourth mirrors to compensate for dispersion of light, and a separation distance that may be formed to be variable in a horizontal direction of the third and fourth mirrors with respect to the first and second mirrors, and the second and third mirrors are formed to be movable relative to the first and fourth mirrors in a vertical direction.

Also, the dispersion compensation scanning unit may include an optical circulator that is coupled to one end of the optical fiber resonator to output light made incident through the optical fiber resonator to an adjustment output terminal and causes light made incident through the adjustment output terminal to be incident to the other end of the optical fiber resonator, a fifth mirror that reflects light emitted through the adjustment output terminal of the optical circulator in a direction different from an incident path, a sixth mirror that is disposed to face the fifth mirror and disposed to reflect light made incident from the fifth mirror in a direction different from that of the fifth mirror, and a reference mirror that is disposed to reflect light made incident from the sixth mirror to the sixth mirror, a grating having an uneven pattern that may be formed on surfaces of the fifth and sixth mirrors to compensate for dispersion of light, and the reference mirror may be controlled by the diagnosis processing unit and provided to be movable so that a separation distance between the reference mirror and the sixth mirror is variable.

Also, the multi-point sensing optical fiber unit may be formed in such a manner that the optical fibers are mutually bonded in series and a bonded portion is the sensing point.

Also, in the multi-point sensing optical fiber unit, the optical fibers having mutually different lengths may be mutually coupled in parallel so that light made incident through the second output terminal is branched to be reflected at a termination of the optical fiber, or light may be selectively made incident to the optical fibers having mutually different lengths by a multiplexer.

Advantageous Effects

As described above, according to the pulse laser generator and the optical fiber sensor system using the pulse laser generator according to the embodiments of the present invention, light input to the optical detection unit may be analyzed over time while facilitating measurement of physical quantities for the plurality of points, and therefore a structure for analysis may be simplified.

MODES OF THE INVENTION

Hereinafter, a pulse laser generator and an optical fiber sensor system using the same according to a preferred embodiment of the present invention will be described in detail with reference to the accompanying drawings.

Figure 1:
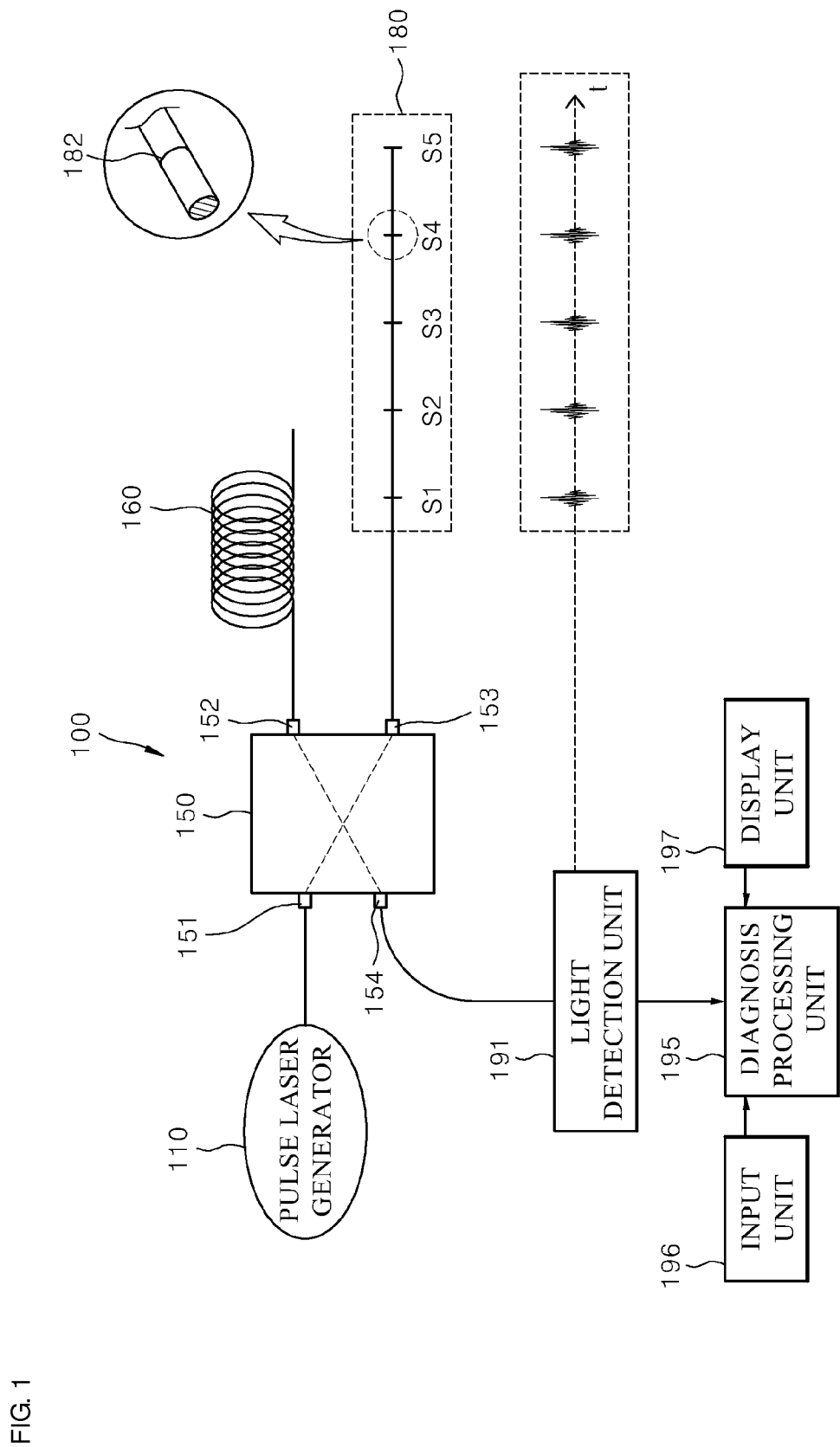
FIG. 1 is a view showing an optical fiber sensor system using a pulse laser generator according to a first embodiment of the present invention.

FIG. 1 is a view showing an optical fiber sensor system using a pulse laser generator according to a first embodiment of the present invention.

Referring to FIG. 1, an optical fiber sensor system 100 according to an embodiment of the present invention includes a pulse laser generator 110, a main optical coupler 150, a reference optical fiber 160, a multi-point sensing optical fiber unit 180, an optical detection unit 191, and a diagnosis processing unit 195.

The pulse laser generator 110 generates and outputs mode-locked pulse laser light.

Figure 2:
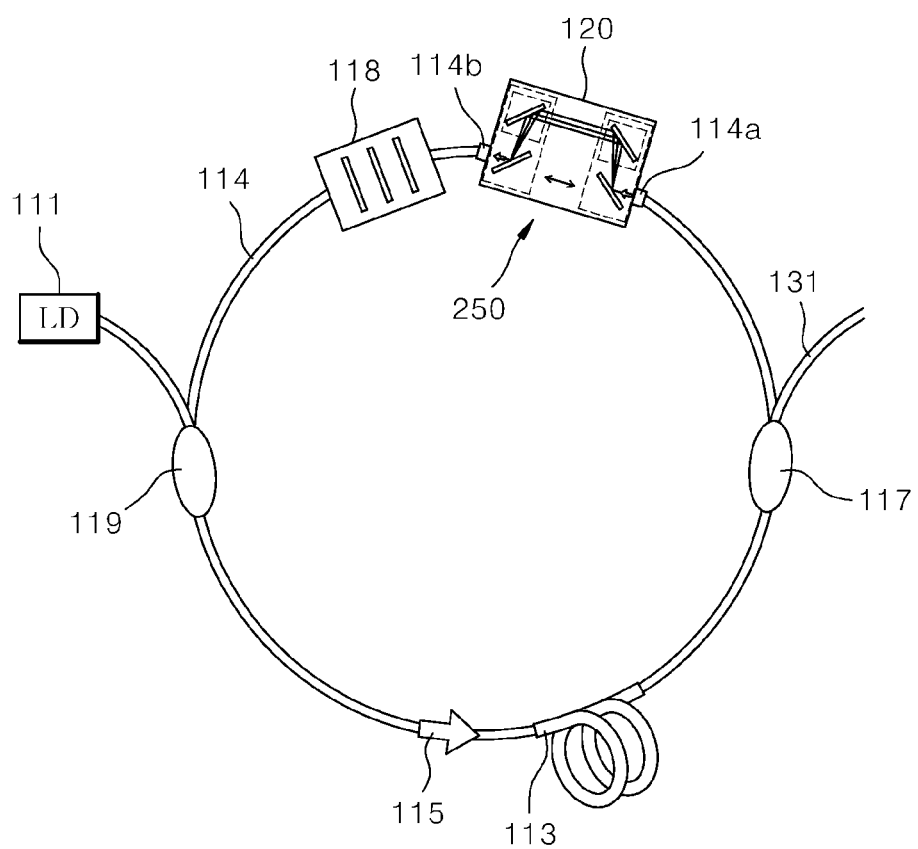
FIG. 2 is a view showing a first example of the pulse laser generator of FIG. 1.

The pulse laser generator 110 includes a pumping light source 111, an optical input unit 119, an amplification optical fiber 113, an optical fiber resonator 114, an isolator 115, an output optical coupler 117, a phase synchronization unit 118, and a dispersion compensation scanning unit 120, as shown in FIG. 2.

The pumping light source 111 emits pumping light to the optical fiber resonator 114. In the pumping light source 111, a laser diode (LD) for emitting laser light is applied.

The optical input unit 119 may enable light emitted from the pumping light source 111 to be input into the optical fiber resonator 114, and an optical coupler or a wavelength division multiplexer (WDM) may be applied to the optical input unit 119. The isolator 115 is installed in series within a ring-shaped loop track of the optical fiber resonator 114, and guides a light traveling direction in one direction.

The amplification optical fiber 113 is formed as an optical fiber doped with ytterbium (Yb) or erbium (Er), and is installed in series within the ring-shaped loop track of the optical fiber resonator 114 to amplify light made incident through the optical input unit 119.

The output optical coupler 117 is coupled to the optical fiber resonator 114 to output a part of the resonating light through a main output terminal 131.

The optical fiber resonator 114 forms a ring-shaped resonator on a closed track using a single mode optical fiber so that light supplied from the pumping light source 111 through the optical input unit 119 is circulated while resonating through the amplification optical fiber 113, and the dispersion compensation scanning unit 120 which will be described below is connected to both ends 114a and 114b of the optical fiber resonator 114.

The output optical coupler 117 is coupled to the optical fiber resonator 114, and outputs output light through the main output terminal 131.

The phase synchronization unit 118 is coupled to the inside of the optical fiber resonator 114 to synchronize a phase.

The phase synchronization unit 118 has a structure including a plurality of phase plates that change polarization of incident light. Here, as the phase plates of the phase synchronization unit 118, a single half wavelength phase plate and two ¼ wavelength phase plates may be applied.

The dispersion compensation scanning unit 120 may be coupled to the both ends 114a and 114b of the optical fiber resonator 114 to adjust a pulse width to be narrow by compensating for dispersion of input light and vary the entire resonance length including the optical fiber resonator 114.

Figure 3:
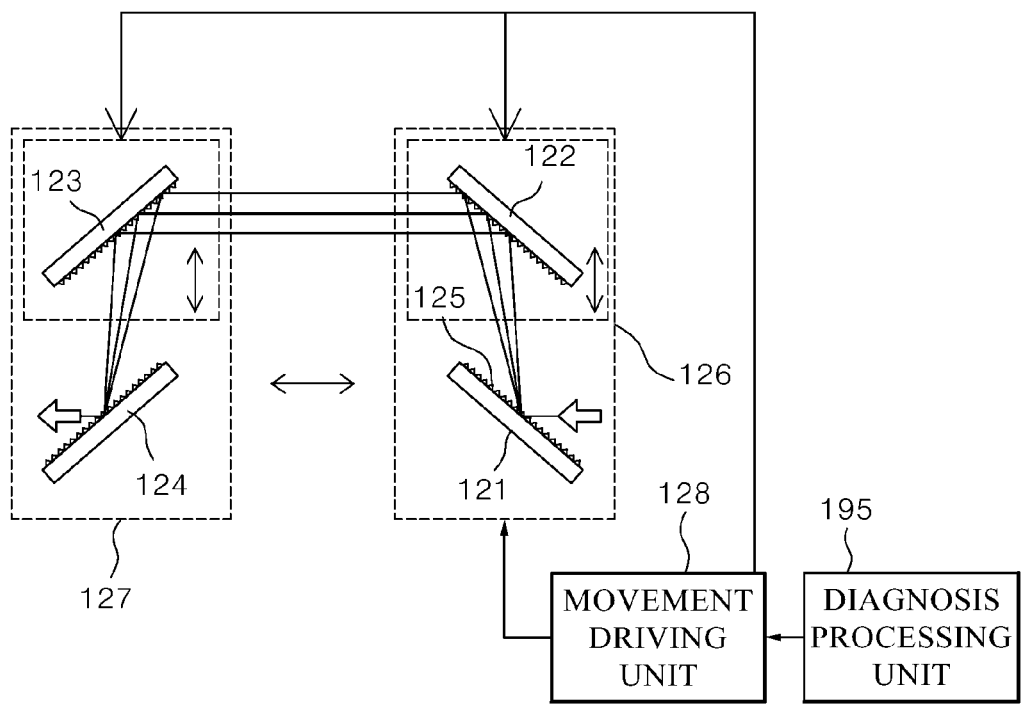
FIG. 3 is an enlarged view of a portion that varies a resonance length of a dispersion compensation scanning unit of FIG. 2.

The dispersion compensation scanning unit 120 will be described in detail with reference to FIG. 3.

The dispersion compensation scanning unit 120 includes first to fourth mirrors 121 to 124. That is, the first mirror 121 is disposed to reflect light made incident through one end of the optical fiber resonator 114 in a direction different from an incident path, that is, toward the second mirror 122.

The second mirror 122 is disposed to face the first mirror 121, and disposed to reflect light made incident from the first mirror 121 in a direction different from that of the first mirror 121, that is, toward the third mirror 123.

The third mirror 123 is disposed to reflect light made incident from the second mirror 122 in a direction different from that of the second mirror 122, that is, toward the fourth mirror 124.

The fourth mirror 124 is disposed to reflect light made incident from the third mirror 123 so that the reflected light is made incident to the other end 114b of the optical fiber resonator 114.

A grating having an uneven pattern 125 is formed on surfaces of the first to fourth mirrors 121 to 124 so as to compensate for dispersion of incident light. The first to fourth mirrors 121 to 124 serve as a diffraction grating to adjust a path of light, so that a pulse width of dispersed light is compressed to be narrow.

Here, unlike the illustrated example, obviously, the first to fourth mirrors 121 to 124 can be constructed so as to perform dispersion compensation by applying a plurality of prisms.

In addition, the dispersion compensation scanning unit 120 is constructed in such a manner that the first mirror 121 and the second mirror 122 are provided in a first housing 126, the third mirror 123 and the fourth mirror 124 are provided in a second housing 127, and the first housing 126 is constructed to be movable relative to the second housing 127 in a horizontal direction.

Unlike the illustrated example, obviously, the second housing 127 in which the third mirror 123 and the fourth mirror 124 are provided can be constructed to be movable relative to the first housing 126.

In addition, the second mirror 122 and the third mirror 123 are formed to be movable relative to the first mirror 121 and the fourth mirror 124 in a vertical direction.

Here, in the first housing 126, the second mirror 122, and the third mirror 123, a horizontal separation distance between the first housing 126 and the second housing 127 and a vertical separation distance between the second mirror 122 and the third mirror 123 are varied by driving of a movement driving unit 128 controlled by the diagnosis processing unit 195 so that variation of a length of an optical path and dispersion compensation may be simultaneously performed.

Here, obviously, a movement structure of the first housing 126 relative to the second housing 127 may be constructed in various ways such as a structure in which the first housing 126 is movably coupled to the second housing 127 through a rail (not shown), a structure in which the first housing 126 is moved forward and backward by a cylinder (not shown), and the like.

In addition, a movement structure of the second mirror 122 within the first housing 126 and a movement structure of the third mirror 123 within the second housing 127 are constructed in such a manner that the second mirror 122 and the third mirror 123 within the first housing 126 and the second housing 127 are controlled by the movement driving unit 128 and vertically linked with each other by the same movement distance to be movable.

Figure 4:
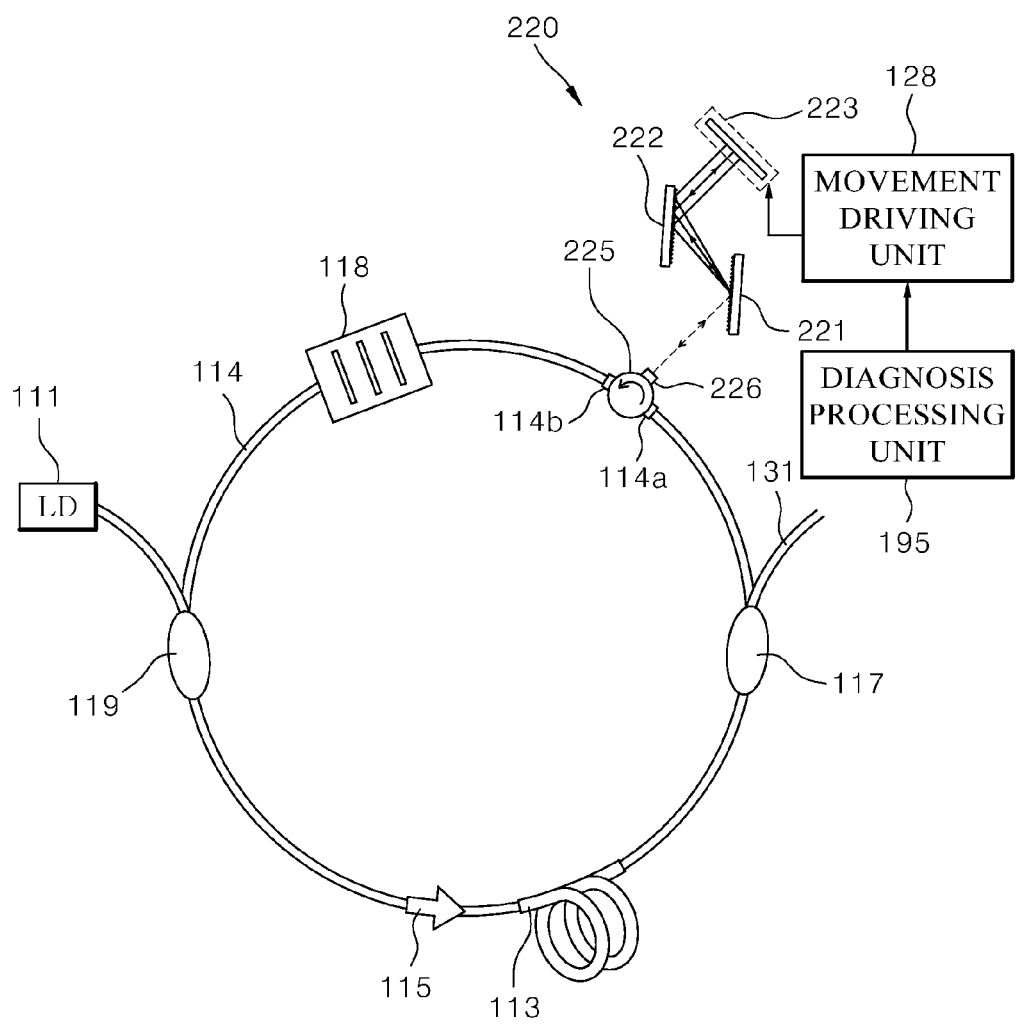
FIG. 4 is a view showing a second example of the pulse laser generator of FIG. 1.

Meanwhile, unlike the illustrated example, the dispersion compensation scanning unit 220 may have a structure of including an optical circulator 225, fifth and sixth mirrors 221 and 222, and a reference mirror 223, as shown in FIG. 4.

Here, the optical circulator 225 is coupled to one end 114a of the optical fiber resonator 114 to output light made incident through the optical fiber resonator 114 to an adjustment output terminal 226 and to make light made incident through the adjustment output terminal 226 incident to the other end 114b of the optical fiber resonator 114.

The fifth mirror 221 is disposed to reflect light emitted through the adjustment output terminal 226 of the optical circulator 225 toward the sixth mirror 222 that is a direction different from a path in which light is made incident.

The sixth mirror 222 is disposed to face the fifth mirror 221, and disposed to reflect light made incident from the fifth mirror 221 toward the reference mirror 223 that is a direction different from the fifth mirror 221.

Here, a grating having an uneven pattern is formed on surfaces of the fifth and sixth mirrors 221 and 222 so as to compensate for dispersion of light.

The reference mirror 223 is disposed to reflect light made incident from the sixth mirror 222 to the sixth mirror 222 again.

Here, the reference mirror 223 is provided to be movable so that a separation distance between the reference mirror 223 and the sixth mirror 222 is varied by the movement driving unit 128.

The main optical coupler 150 receives pulse laser light generated from the pulse laser generator 110 from a first input terminal 151 connected to the main output terminal 131 of the pulse laser generator 110, branches the received light into a first output terminal 152 and a second output terminal 153 to output the branched light, and outputs, through a third output terminal 154, light input reversely from each of the first output terminal 152 and the second output terminal 153.

The reference optical fiber 160 is connected to the first output terminal 152 and reflects the input light at a termination of the reference optical fiber 160 to provide a reference optical signal, and an optical fiber that extends by a predetermined length is applied to the reference optical fiber 160.

The multi-point sensing optical fiber unit 180 is connected to the second output terminal 153, and in the multi-point sensing optical fiber unit 180, an optical fiber is connected in series corresponding to a plurality of sensing points S1 to S5 so as to measure a physical quantity to be measured for each of the plurality of sensing points S1 to S5.

The multi-point sensing optical fiber unit 180 has a sensing unit that is formed in such a manner that optical fibers are mutually bonded in series and a bonded portion 182 is a sensing point for reflecting a part of incident light. Here, a separation distance between the adjacent sensing points S1 to S5 may be formed at equal intervals.

Unlike the illustrated example, in the multi-point sensing optical fiber unit 180, the optical fibers having mutually different lengths may be mutually coupled in parallel so that light made incident through the second output terminal 153 is branched to be reflected at a termination of the optical fiber, or light may be selectively made incident by a multiplexer.

Figure 5:
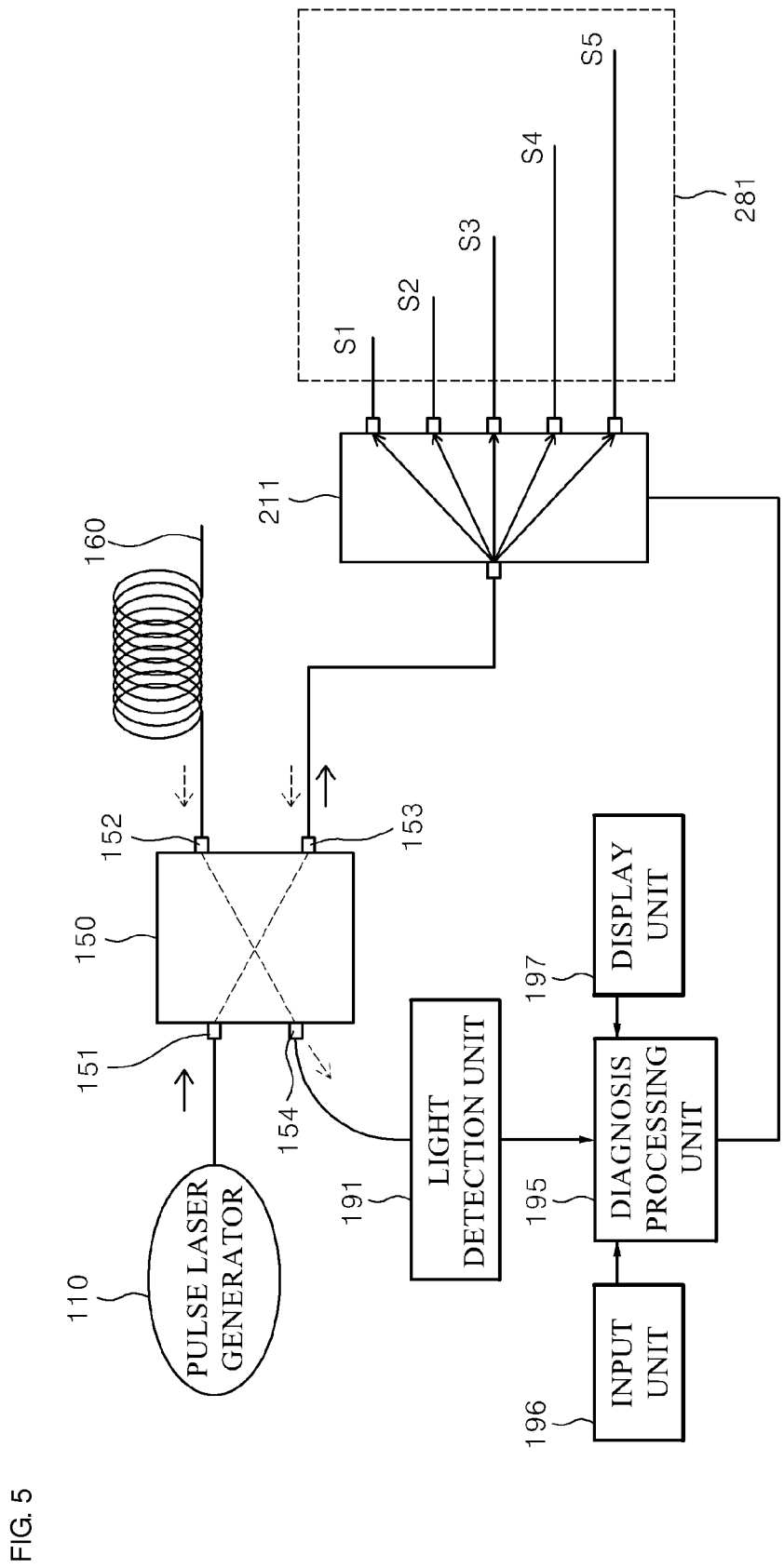
FIG. 5 is a view showing an optical fiber sensor system according to a second embodiment of the present invention.
Figure 6:
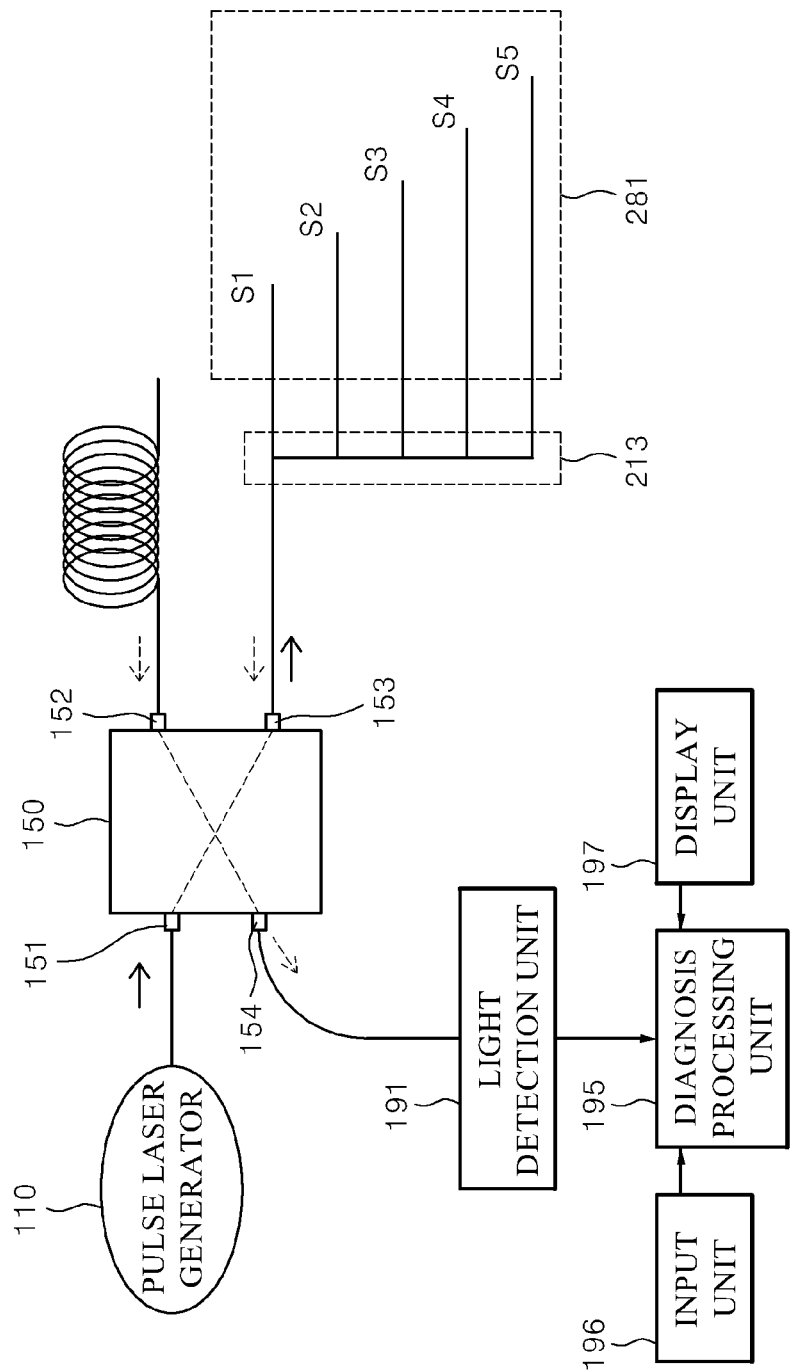
FIG. 6 is a view showing an optical fiber sensor system according to a third embodiment of the present invention.

That is, as shown in FIG. 5, obviously, a multiplexer 211, that is an optical switch, is connected to the second output terminal 153 so that light input from the main optical coupler 150 selectively or sequentially connects output channels to which optical fibers having mutually different extending lengths are connected while the light is being circulated. Alternatively, instead of applying the multiplexer 211, a structure in which an optical splitter 213 through which light may be transmitted in both directions as shown in FIG. 6 is applied and the optical fibers having mutually different lengths are connected to the output channels of the optical splitter 213 may be constructed.

Here, the optical fibers having mutually different lengths which are respectively connected to the output channels of the multiplexer 211 or the optical fibers having mutually different lengths which are respectively connected to the output channels of the optical splitter 213 correspond to a sensing unit 281, and a termination of each optical fiber corresponds to the sensing point.

A difference in lengths of the sensing optical fibers constituting the sensing unit 281 is obtained by applying a difference by an integral multiple of a predetermined unit length.

The optical detection unit 191 converts optical signals input through the third output terminal 154 into electrical signals.

An input unit 196 may set a physical quantity to be measured or a supported function. Here, the physical quantity to be measured refers to a temperature, pressure, deformation, and the like.

A display unit 197 is controlled by the diagnosis processing unit 195 to display information to be displayed.

The diagnosis processing unit 195 detects a change of the physical quantity for the sensing points from the signals output from the optical detection unit 191.

The diagnosis processing unit 195 calculates the change of the physical quantities of the sensing points through an interference pattern input via the optical detection unit 191 while moving the dispersion compensation scanning unit 120 within a movement distance range in which a resonance length is set by the movement driving unit 128 for moving the dispersion compensation scanning unit 120.

That is, the diagnosis processing unit 195 may calculate the change of the physical quantities using a difference of detection times of peak signals when the optical fiber is stretched or contracted by a temperature or other external environmental factors from signals input from each of the sensing points S1 to S5 in the optical detection unit 191 of FIG. 1 with a time interval so as to correspond to a difference of the optical path lengths.

In addition, the diagnosis processing unit 195 may be constructed in such a manner that a lookup table (not shown) in which change values of the physical quantities corresponding to the difference of the peak detection times detected from the optical detection unit 191 are recorded in advance by experiments is built in the diagnosis processing unit 195, and the physical quantities which are set with reference to the lookup table are calculated for each of the sensing points.

The optical fiber sensor system 100 may be installed in such a manner that the sensing points are located at a position desired to be measured such as a bridge or a building structure.

The invention claimed is:

1. An optical fiber sensor system using a pulse laser, comprising:
   a pulse laser generator that generates and outputs pulse laser light;
   a main optical coupler that receives the pulse laser light generated and outputted from the pulse laser generator from a first input terminal, branches the received light to a first output terminal and a second output terminal to output the branched light, and outputs, through a third output terminal, light input reversely from each of the first output terminal and the second output terminal;
   a reference optical fiber that is connected to the first output terminal and reflects light input through the main optical coupler to provide a reference optical signal, and extends by a predetermined length as an optical fiber;
   a multi-point sensing optical fiber unit that is connected to the second output terminal, and in which optical fibers are connected in series or in parallel corresponding to a plurality of sensing points so as to measure a physical quantity to be measured for each of the plurality of sensing points;
   an optical detection unit that converts an optical signal input through the third output terminal into an electrical signal; and
   a diagnosis processing unit that detects a change of the physical quantity which is set for the sensing points from a signal output from the optical detection unit,
   wherein the multi-point sensing optical fiber unit is formed in such a manner that the optical fibers are mutually bonded in series and a bonded portion is the sensing point or the optical fibers having mutually different lengths are mutually coupled in parallel so that light made incident through the second output terminal is branched to be reflected at a termination of the optical fiber, or light is selectively made incident to the optical fibers having mutually different lengths by a multiplexer.

2. The optical fiber sensor system of claim 1, wherein the pulse laser generator includes:
   a pumping light source that emits light;
   an amplification optical fiber doped with ytterbium or erbium that amplifies light made incident from the pumping light source;
   an optical fiber resonator that forms a ring type resonator using the optical fiber so that light supplied from the pumping light source resonates while being circulated through the amplification optical fiber;
   an optical input unit that causes light emitted from the pumping light source to be incident to the optical fiber resonator;
   an output optical coupler that is coupled to the optical fiber resonator to output pulse light generated from the optical fiber resonator through a main output terminal;
   a phase synchronization unit that is coupled to the optical fiber resonator to synchronize a phase; and
   a dispersion compensation scanning unit that is coupled to both ends of the optical fiber resonator to compensate for dispersion of input light so that a pulse width is adjusted narrow, and is controlled by the diagnosis processing unit so that a resonance length of the optical fiber resonator is variable.

3. The optical fiber sensor system of claim 2, wherein
   the dispersion compensation scanning unit includes a first mirror that is disposed to reflect light made incident through one end of the optical fiber resonator in a direction different from an incident path, a second mirror that is disposed to face the first mirror and is disposed to reflect light made incident from the first mirror in a direction different from that of the first mirror, a third mirror that is disposed to reflect light made incident from the second mirror in a direction different from that of the second mirror, and a fourth mirror that is disposed to reflect light made incident from the third mirror so that the reflected light is made incident to the other end of the optical fiber resonator,
   a grating having an uneven pattern is formed on surfaces of the first to fourth mirrors to compensate for dispersion of light, and
   a separation distance is formed to be variable in a horizontal direction of the third and fourth mirrors with respect to the first and second mirrors, and the second and third mirrors are formed to be movable relative to the first and fourth mirrors in a vertical direction.

4. The optical fiber sensor system of claim 2, wherein
   the dispersion compensation scanning unit includes an optical circulator that is coupled to one end of the optical fiber resonator to output light made incident through the optical fiber resonator to an adjustment output terminal and causes light made incident through the adjustment output terminal to be incident to the other end of the optical fiber resonator, a fifth mirror that reflects light emitted through the adjustment output terminal of the optical circulator in a direction different from an incident path, a sixth mirror that is disposed to face the fifth mirror and disposed to reflect light made incident from the fifth mirror in a direction different from that of the fifth mirror, and a reference mirror that is disposed to reflect light made incident from the sixth mirror to the sixth mirror,
   a grating having an uneven pattern is formed on surfaces of the fifth and sixth mirrors to compensate for dispersion of light, and
   the reference mirror is controlled by the diagnosis processing unit and provided to be movable so that a separation distance between the reference mirror and the sixth mirror is variable.

5. A pulse laser generator that generates pulse laser light, comprising:
   a pumping light source that emits light;
   an amplification optical fiber doped with ytterbium or erbium that amplifies light made incident from the pumping light source;
   an optical fiber resonator that forms a ring type resonator using the optical fiber so that light supplied from the pumping light source resonates while being circulated through the amplification optical fiber;
   an optical input unit that causes light emitted from the pumping light source to be incident to the optical fiber resonator;
   an output optical coupler that is coupled to the optical fiber resonator to output pulse light generated from the optical fiber resonator through a main output terminal;
   a phase synchronization unit that is coupled to the optical fiber resonator to synchronize a phase; and
   a dispersion compensation scanning unit that is coupled to both ends of the optical fiber resonator to compensate for dispersion of input light so that a pulse width is adjusted narrow, and is controlled by a diagnosis processing unit so that a resonance length of the optical fiber resonator is variable, wherein the dispersion compensation scanning unit includes a first mirror that is disposed to reflect light made incident through one end of the optical fiber resonator in a direction different from an incident path, a second mirror that is disposed to face the first mirror and is disposed to reflect light made incident from the first mirror in a direction different from that of the first mirror, a third mirror that is disposed to reflect light made incident from the second mirror in a direction different from that of the second mirror, and a fourth mirror that is disposed to reflect light made incident from the third mirror so that the reflected light is made incident to the other end of the optical fiber resonator, a grating having an uneven pattern is formed on surfaces of the first to fourth mirrors to compensate for dispersion of light, and a separation distance is formed to be variable in a horizontal direction of the third and fourth mirrors with respect to the first and second mirrors, and the second and third mirrors are formed to be movable relative to the first and fourth mirrors in a vertical direction.

6. A pulse laser generator that generates pulse laser light, comprising:

a pumping light source that emits light;

an amplification optical fiber doped with ytterbium or erbium that amplifies light made incident from the pumping light source;

an optical fiber resonator that forms a ring type resonator using the optical fiber so that light supplied from the pumping light source resonates while being circulated through the amplification optical fiber;

an optical input unit that causes light emitted from the pumping light source to be incident to the optical fiber resonator;

an output optical coupler that is coupled to the optical fiber resonator to output pulse light generated from the optical fiber resonator through a main output terminal;

a phase synchronization unit that is coupled to the optical fiber resonator to synchronize a phase; and a dispersion compensation scanning unit that is coupled to both ends of the optical fiber resonator to compensate for dispersion of input light so that a pulse width is adjusted narrow, and is controlled by a diagnosis processing unit so that a resonance length of the optical fiber resonator is variable, wherein the dispersion compensation scanning unit includes an optical circulator that is coupled to one end of the optical fiber resonator to output light made incident through the optical fiber resonator to an adjustment output terminal and causes light made incident through the adjustment output terminal to be incident to the other end of the optical fiber resonator, a fifth mirror that reflects light emitted through the adjustment output terminal of the optical circulator in a direction different from an incident path, a sixth mirror that is disposed to face the fifth mirror and disposed to reflect light made incident from the fifth mirror in a direction different from that of the fifth mirror, and a reference mirror that is disposed to reflect light made incident from the sixth mirror to the sixth mirror, a grating having an uneven pattern is formed on surfaces of the fifth and sixth mirrors to compensate for dispersion of light, and the reference mirror is provided to be movable so that a separation distance between the reference mirror and the sixth mirror is variable.

\* \* \* \* \*